United States Patent [19]

Cearley et al.

[11] Patent Number: 4,676,948

[45] Date of Patent: Jun. 30, 1987

[54] NUCLEAR REACTOR CONTROL ROD

[75] Inventors: James E. Cearley; Kenneth R. Izzo, both of San Jose, Calif.

[73] Assignee: General Electric Company, San Jose, Calif.

[21] Appl. No.: 764,677

[22] Filed: Aug. 12, 1985

[51] Int. Cl.$^4$ ............................................. G21C 7/00
[52] U.S. Cl. ................................... 376/333; 376/327; 376/239; 376/459
[58] Field of Search ............... 376/327, 333, 339, 219, 376/221, 239, 242, 237, 458, 459, 904, 906

[56] References Cited

U.S. PATENT DOCUMENTS 4,285,769 8/1981 Specker ............................. 376/327

FOREIGN PATENT DOCUMENTS 0088945 3/1983 European Pat. Off. ............ 376/327

Primary Examiner—Donald P. Walsh
Attorney, Agent, or Firm—I. J. James, Jr.; R. G. Simkins

[57] ABSTRACT

A control rod for a nuclear reactor wherein plates of neutron absorbing material (e.g. hafnium) are used in the upper portion thereof and tubes containing a different neutron absorbing material (e.g. boron) are positioned beneath the plates. To relieve the tubes of the weight of the plates, the plates are attached to support members of the control rod frame, to prevent or reduce the area of a gap between the plates and the tubes, joints therebetween are provided.

28 Claims, 10 Drawing Figures

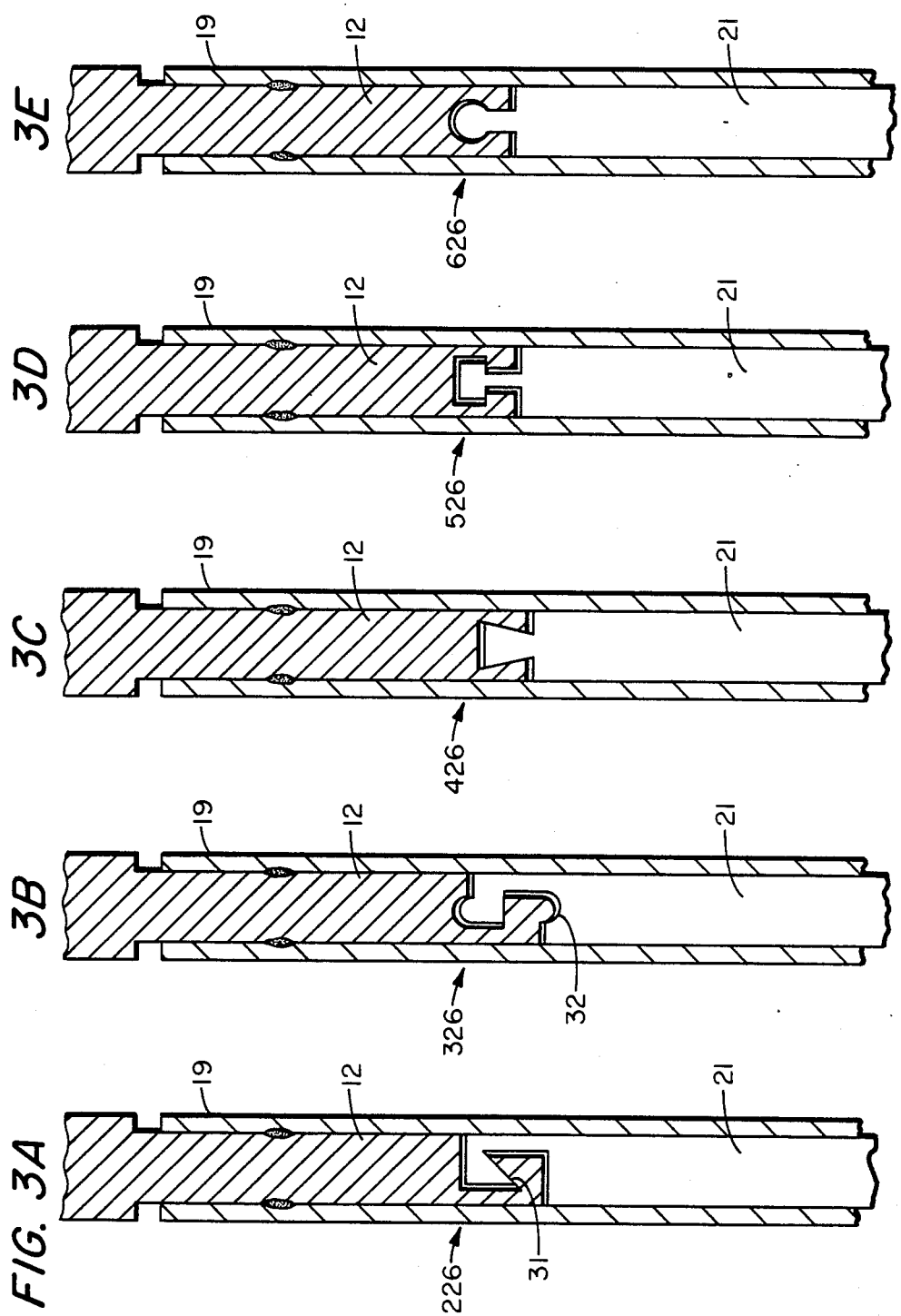

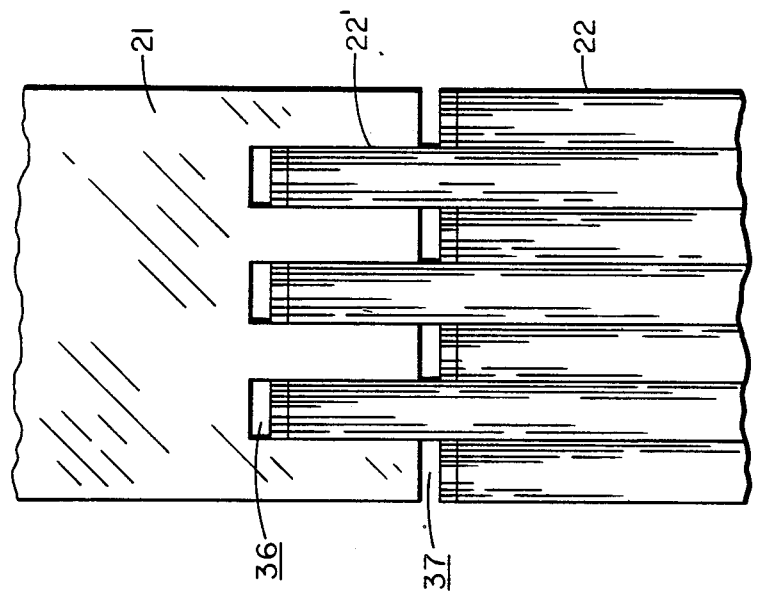
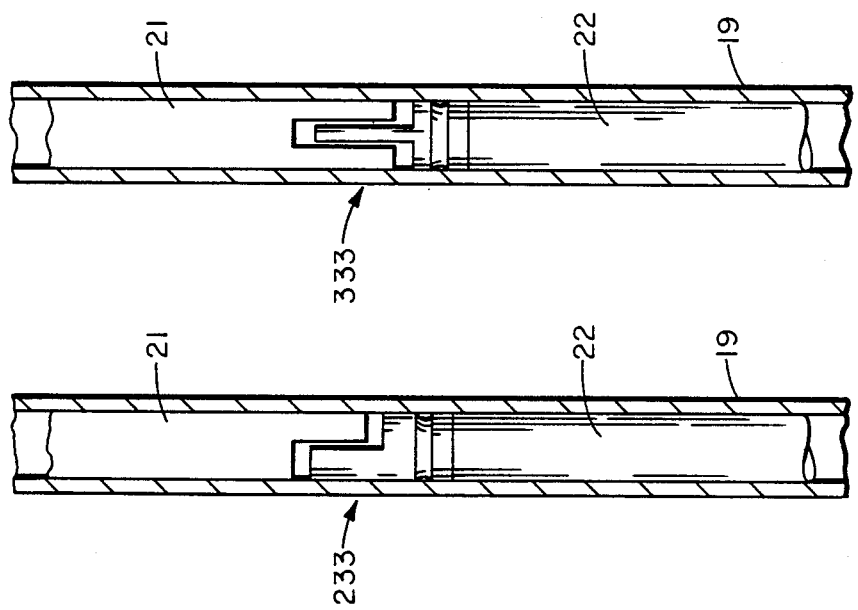
FIG. 4C
FIG. 4B
FIG. 4A

NUCLEAR REACTOR CONTROL ROD

BACKGROUND

This invention relates to a control rod for a nuclear reactor and particularly to attachment arrangements for securing plates of neutron absorbing material to the frame of the control rod and joints between such plates and other absorber members of the control rod.

In well-known commercial nuclear power reactors, for example as used in the Dresden Nuclear Power Station near Chicago, Ill., the nuclear fuel typically is in the form of sintered pellets contained in elongated cladding tubes. Such fuel elements are arranged in groups and supported between upper and lower tie plates in separately replaceable fuel assemblies or bundles as shown, for example, in U.S. Pat. No. 3,689,358. A sufficient number of such fuel assemblies are arranged in a matrix, approximating a right circular cylinder, to form the nuclear reactor core capable of self-sustained fission reaction. The core is submerged in a fluid, such as light water, which serves both as a working fluid and a neutron moderator.

Nuclear reactors are typically refueled periodically with an excess of reactivity sufficient to maintain operation throughout an operating cycle often in the order of one year in length of time. The reactor is then shut down and a fraction of the fuel assemblies, typically about one-quarter of the fuel assemblies, are replaced. The excess reactivity at the beginning of a cycle of operation requires a control system of sufficient strength to maintain the effective multiplication factor at unity during reactor operation. The control system customarily comprises neutron absorbing materials that serve to control the neutron population by nonfission absorption or capture of neutrons.

Typically, the control system includes mechanical control in the form of a plurality of control rods, containing neutron absorbing material, which are selectively insertable in the spaces or gaps among the fuel assemblies to control the reactivity, and hence the power level of operation, of the core. In a known arrangement, such as shown for example in U.S. Pat. No. 3,020,888, the control rod blades have a cross or cruciform transverse cross section whereby the blades of each control rod are insertable in the spaces between adjacent four fuel assemblies.

In a typical boiling water reactor (BWR) the control rods are of the bottom entry type (i.e. insertable from the bottom of the pressure vessel into the nuclear core).

Examples of such control rods are shown by Steven R. Specker et al in FIGS. 9A–10 of U.S. Pat. No. 4,285,769. Briefly, a control rod of this type has a structural frame including an elongated central spine with laterally extending cruciform (or four-armed) support members at each end. A plurality of sealed tubes containing neutron absorbing material (such as a powered boron compound) are positioned between the upper and lower arms of the support member and are covered with a U-shaped sheath attached to the upper and lower arms and to the central spine to form four laterally extending control rod blades.

In a version of a control rod shown in FIG. 9D of the above-mentioned U.S. Pat. No. 4,285,769, the boron material in the upper portions of the blades is replaced by a neutron absorbing material such as hafnium to provide a longer useful control rod lifetime as explained in that patent.

As illustrated in that patent, the hafnium material is shown as replacing the boron material in the absorber material containing tubes. A more practical arrangement, especially from the manufacturing point of view, is simply to place slabs or plates of hafnium metal in the upper portion of each control rod blade, the tubes of boron material beneath such absorber plates being shortened accordingly.

This arrangement provides several advantages. The plate form provides a significantly greater amount of hafnium per unit volume of control blade space as compared to hafnium in adjacent tubes of circular cross section. There are no tubes containing both hafnium and boron material to keep track of during manufacture and assembly.

However, this arrangement is not without its problems. Plates of absorber material such as hafnium metal are relatively heavy. Thus if the absorber plate is simply allowed to rest on the upper ends of the boron-containing tubes therebeneath, there is the risk that these long, slender thin-walled absorber tubes may be over-stressed and tend to bend or even buckle. This is especially true during scram of the reactor when the rapid upward acceleration of the control rod multiplies the force of the absorber plate on the tubes.

It is an object of this invention to provide an attachment between the lower edges of the upper support arms of the control rod frame and the upper edges of the absorber plates whereby the frame supports the plates.

For such attachment it is desirable to avoid welding (because of incompatible materials) and the use of rivets, screws or the like (because of risk of coming loose and/or stress/corrosion failure).

Attachment of the absorber plates to the upper support arms creates another potential problem. Usual manufacturing tolerances are such that, with the absorber plates attached to the upper support arms and the absorber tubes resting on the lower support arms, gaps may be left between the lower edges of the absorber plates and the upper end plugs of the absorber tubes. Such gaps undesirably act as "neutron windows" allowing neutrons to pass through the control blades without encountering absorber material.

It is another object of this invention to provide arrangements for avoiding such gaps or reducing such gaps to acceptable cross section area.

SUMMARY

The foregoing and other objects of the invention are achieved as follows. Attachment is provided between the absorber plates and the upper support members of the control rod frame so that the frame supports the absorber plates, the absorber plates thus being suspended therefrom. The preferred attachment avoids welding or the use of rivets, screws or the like.

Broadly stated, the preferred attachment comprises longitudinally oriented lands and grooves formed in the lower edges of the upper support members and mating lands and grooves formed in the upper edges of the absorber plates. Such attachment may take several suitable specific forms such as forms of grooved lap joints and forms of slot joints such as T, dovetail and circular or keyhole slot joints.

To avoid an undesirable gap between the suspended absorber plates and the absorber tubes therebeneath a similar attachment can be used between the lower edges of the absorber plates and the upper end plugs of the absorber tubes. As an alternative such gap can be avoided by extending the upper end plugs to provide a joint having an ungrooved overlap with the lower edge of the absorber plate. As another alternative, every other one of the absorber tubes beneath the absorber plates is somewhat elongated and the absorber plates are formed with vertical slots to receive these elongated tubes whereby the neutron window area is reduced to an acceptable level.

DRAWING

The invention is described more specifically hereinafter with reference to the accompanying drawing wherein:

FIGS. 3A–3E are cross section detail views illustrating alternate forms of the absorber plate-to-support member attachment; and FIGS. 4A–4C are cross section detail views illustrating alternate forms of the absorber plate-to-absorber tube joints.

DESCRIPTION

Figure 1:
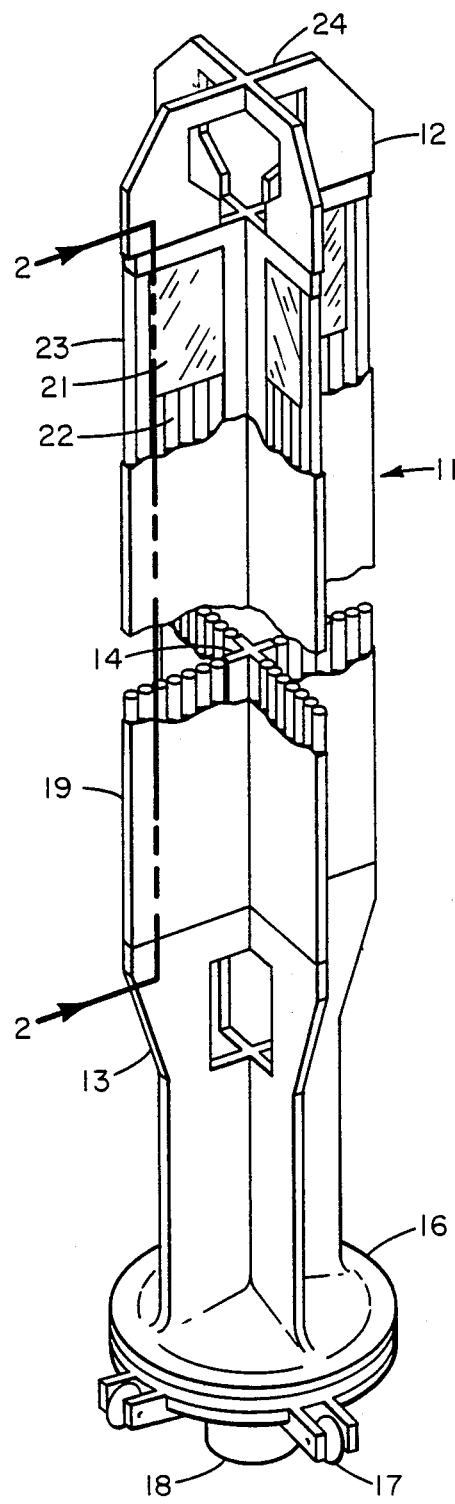
FIG. 1 is a partly cutaway isometric view of a control rod.

Several versions of bottom entry control rods are discussed in the hereinbefore referenced U.S. Pat. No. 4,285,769. A control rod 11 of this type according to this invention is illustrated in FIG. 1.

The frame of the control rod 11, typically formed of a stainless steel, includes an upper casting or upper support member 12 connected to a lower casting or lower support member 13 by an elongated central post or spine 14, all of cruciform shape. The lower support member 13 is formed with a velocity limiter 16, guide rollers 17 and a coupling socket 18 for attachment to a suitable control rod drive mechanism (not shown).

The upper and lower support members 12 and 13 are formed with laterally extending arms and sheaths 19 having a U-shape are attached thereto and to the central spine 14 to form the four blades of the control rod.

Contained within each of the blades of the control rod 11, between the laterally extending arms of the upper and lower support members 12 and 13, are members of neutron absorbing material. In the illustrated control rod 11 the neutron absorbing material is in three different forms.

Positioned beneath the lower edges of the arms of upper support member 12 and adjacent to the spine 14 are plates 21 of neutron absorbing material such as hafnium metal.

Extending from beneath the lower edges of the absorber plates 21 are sealed tubes 22, typically of stainless steel, containing a neutron absorbing material such as boron carbide ($B_4C$) typically in powder form. Positioned along the outer edge of each blade of the control rod 11 is one or more rods 23 of solid neutron absorbing material such as hafnium metal.

Because of the steep neutron flux gradients in the blades of a control rod, the upper end and the outer edges thereof are subjected to the highest incident neutron flux, the greatest neutron capture rate and, hence, the shortest life. Therefore, a material such as hafnium in these positions provides a greater control rod life as compared to a control rod using only $B_4C$.

As its upper end, the upper support member 12 is formed with a handle arrangement 24 which can be engaged by a suitable tool (not shown) for installing and removing the control rod 11. In FIG. 9A of U.S. Pat. No. 4,285,769 there is shown a control rod with a handle which is enlarged (compared to previous practice) for the purpose of providing a "grey" tip effect. As illustrated in FIG. 1 herein, the handle arrangement 24 is a double handle which further enhances the grey tip effect.

As discussed hereinbefore, a problem attendant the use of the absorber plates 21 is their relatively heavy weight. If the plates 21 are simply allowed to rest on the absorber tubes 22 the force on these tubes may be greater than desirable. This is especially true during scram of the reactor when the control rods are driven rapidly upward, the acceleration of the control rod thus multiplying the force of the plates 21 on the tubes 22.

To solve this problem there is provided, according to this invention, an attachment between the lower edge of the extended arm of the upper support member 12 and the upper edge of the absorber plate 21 therebeneath whereby the plates 21 are suspended from and supported by the upper support member 12.

Figure 2:
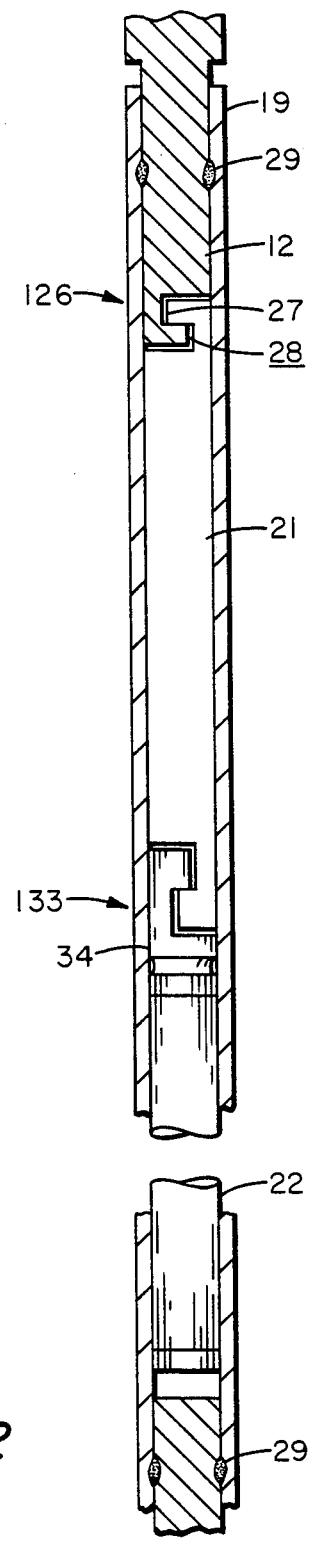
FIG. 2 is a vertical cross section edge view of one of the control blades of the control rod taken along the line 2—2 of FIG. 1.

A first version of such an attachment 126 is shown in FIG. 2 which is a vertical cross section edgewise view of one of the blades of the control rod 11. The attachment 126 has the form of a grooved lap joint, the lower edge of the upper support member 12 and the upper edge of the absorber plate 21 being formed with mating lands 27 and grooves 28. When assembled in the control rod blade the attachment 126 is prevented from disengagement by the sketch 19 which is attached, as by spot welds 29, to the upper and lower support members 12 and 13, and the central spine 14.

Other suitable forms of the support member-to-absorber plate attachment are illustrated in FIGS. 3A–3E. In FIG. 3A the lands and grooves of attachment 226 are formed with a tapered portion 31 in the nature of a half dovetail slot joint. In FIG. 3B the lands and grooves of attachment 326 are formed with extended, interlocking half-round portions 32. In FIG. 3C an attachment 426 has the form of a dovetail slot. In FIG. 3D an attachment 526 has the form of a T-slot while an attachment 626 shown in FIG. 3E is of the circular or key-hole slot type of joint.

The attachments 126–626 have the advantages of ease of assembly, the allowance of a limited amount of relative movement, avoidance of the problem of welding incompatible material and avoidance of the use of attachments such as rivets, screws or bolts which might become loose or fail.

With the absorber plates 21 attached to the upper support member 12, if the absorber tubes 22 are allowed simply to rest on the lower support member 13 there is the possibility that gaps will be left between the lower edges of the absorber plates 21 and the upper ends of the absorber tubes 22. As discussed hereinbefore such gaps undesirably act as windows for passage of neutrons.

Therefore according to another aspect of this invention a joint is provided between the lower edge of each absorber plate 21 and the absorber tubes 22 thereunderneath. Several versions of such a joint are suitable.

As shown in FIG. 2 a lap joint 133 with mating lands and grooves (similar to the upper support member-to-absorber plate 21 attachment 126) may be formed in the lower edge of the absorber plate 21 and the upper end plugs 34 of the absorber tubes 22 whereby the tubes 22 are suspended from the plate 21 to thus prevent any gap therebetween. Similarly, any of the attachments 226, 326, 426, 526 and 626 (FIGS. 3A–3E) may be used for attachment of tubes 22 to the plates 21.

Other alternate forms of plate 21-to-tubes 22 joints are shown in FIGS. 4A–4C. FIG. 4A illustrates a simple lap joint 233 with sufficient length to maintain overlap for worst case manufacturing tolerances. in FIG. 4B a joint 33 has the form of a tongue and groove joint. In FIG. 4C an arrangement of absorber tubes of staggered length is used which, while not eliminating the gap, reduces the neutron window area to an acceptable amount. In this version the absorber plate 21 is formed with spaced vertical slots 36 which receive the upper ends of elongated absorber tubes 22', thus reducing the neutron window area of the gap 37.

Thus what has been described is an improved control rod having neutron absorber plates attached to a support member of the control rod frame and joints between the absorber plates and absorber tubes therebetewen which prevent or reduce neutron window area.

What is claimed is:

1. In a vertically oriented bottom entry control rod from a nuclear reactor: a frame including an elongated central spine of cruciform cross section connected between an upper support member and a lower support member both of cruciform shape having four laterally extending arms, the arms of said upper support member being in alignment with the arms of said lower support member and each aligned upper and lower support members having a sheath extending therebetween; absorber plates of neutron absorber material, different from the material of said frame, one of said absorber plates being positioned within a sheath beneath each of said arms of said upper support member; attachment means suspending said absorber plates from said arms of said upper support member within a sheath; a plurality of elongated absorber members positioned within a sheath between each of said suspended absorber plates and an arm of said lower support member; and joint means between the upper ends of said absorber members and the lower ends of said suspended absorber plates for minimizing gaps therebetween; the sheath means enclosing said suspended absorber plates and said absorber members extending between aligned arms of said upper and lower support members and secured thereto.

2. The control rod of claim 1 wherein said attachment means is a type of joint selected from the group grooved-lap, dovetail slot, T-slot and keyhole slot types of joints.

3. The control rod of claim 1 wherein said joint means is a type of joint selected from the group: lap, grooved lap, tongue and groove, dovetail slot, T-slot and keyhole slot types of joints.

4. The control rod of claim 1 wherein said joint means comprises an arrangement of spaced vertical slots in the lower ends of said absorber plates and every other one of said absorber members is elongated to extend into said slots.

5. The control rod of claim 1 including at least one elongated neutron absorbing rod extending between each upper and lower arm of said upper and lower support members near the outer ends thereof.

6. The control rod of claim 5 wherein said neutron absorbing rod is formed of a material similar to the material of said absorber plate.

7. The control rod of claim 1 wherein said absorber plates are formed of hafnium.

8. The control rod of claim 1 wherein said absorber members contain boron.

9. The control rod of claim 1 wherein said frame is formed of stainless steel.

10. The control rod of claim 1 wherein said arms of said upper support member are extended upward and provided with central openings to form a double handle for engagement with control rod handling means.

11. In a vertically oriented bottom entry control rod for a nuclear reactor having a frame including an elongated central spine and a laterally extending support member at the upper end of said spine, said support member having a lower edge: an absorber plate of first neutron absorbing material, different from the material of said frame, having an upper edge adjacent said lower edge of said support member; a support member-to-absorber plate attachment suspending said absorber plate from said support member; a plurality of elongated absorber members containing a second neutron absorbing material extending downward beneath a lower edge of said suspended absorber plate; an absorber plate-to-absorber member joint between said lower edge of said suspended absorber plate and the upper ends of said absorber members for minimizing gaps therebetween; and a sheath covering said suspended absorber plate and said absorber members and secured to said frame of said control rod.

12. The control rod of claim 11 wherein said support member-to-absorber plate attachment comprises mating lands and grooves formed in said lower edge of said support member and in said upper edge of said absorber plate.

13. The control rod of claim 12 wherein said lands and grooves are interlocking.

14. The control rod of claim 11 wherein said support member-to-absorber plate attachment comprises a dovetail slot type of joint.

15. The control rod of claim 11 wherein said support member-to-absorber plate attachment comprises a T-slot type of joint.

16. The control rod of claim 11 wherein said support member-to-absorber plate attachment comprises a keyhole slot type of joint.

17. The control rod of claim 11 wherein said absorber plate-to-absorber member joint comprises mating lands and grooves formed in said lower edge of said absorber plate and the upper ends of said absorber members.

18. The control rod of claim 17 wherein said lands and grooves are interlocking.

19. The control rod of claim 11 wherein said absorber plate-to-absorber member joint is a type of joint selected from the group dovetail slot, T-slot and keyhole slot types of joints.

20. The control rod of claim 11 wherein said absorber plate-to-absorber member joint comprises a lap joint.

21. The control rod of claim 11 wherein said absorber plate-to-absorber member joint comprises a tongue and groove joint.

22. The control rod of claim 11, wherein said absorber plate-to-absorber member joint comprises an arrangement of spaced slots in the lower end of said absorber plate and every other one of said absorber members is elongated to extend into said slots.

23. The control rod of claim 11 wherein said frame is formed of stainless steel and said absorber plate is formed of hafnium.

24. The control rod of claim 23 wherein said second neutron absorbing material is a boron compound.

25. The control rod of claim 11 including at least one rod of absorber material similar to that of said absorber plate, extending coextensive with said absorber plate and the absorber members therebeneath and located outward therefrom with respect to said spine.

26. In a control rod for a nuclear reactor: a frame including an elongated central spine and a laterally extending support member at one end of said spine; an absorber plate of neutron absorber material, different than the material of said frame, positioned adjacent to said support member and suspended therefrom; and an attachment between adjacent edges of said support member and said absorber plate suspended therefrom, said attachment comprising mating lands and grooves formed in said adjacent edges.

27. The control rod of claim 26 wherein said support member is cruciform in shape having four laterally extending arms and including an absorber plate of said neutron absorbing material adjacent each of said arms and an attachment between each of said arms and the adjacent absorber plate.

28. The control rod of claim 26 including a plurality of elongated absorber members containing a neutron absorber material different from the material of said absorber plate, said absorber members being positioned parallel to said spine and in the plane of said absorber plate and each of said absorber members having an end adjacent to said absorber plate; and joint means between said absorber plate and said absorber members for minimizing gaps therebetween.

* * * * *